United States Patent [19]

Isohata et al.

[11] 4,003,752

[45] Jan. 18, 1977

[54] MAGNESIA CEMENT COMPOSITION, PROCESS OF ITS MANUFACTURE, AND COMPOSITE COMPRISING SAME

[75] Inventors: Susumu Isohata; Kazutaka Watabe; Morio Shimoshimizu, all of Fuji; Toshiyuki Iwaisako, Saitama, all of Japan

[73] Assignee: Asahi Kasei Kogyo Kabushiki Kaisha, Osaka, Japan

[22] Filed: May 20, 1975

[21] Appl. No.: 579,068

[30] Foreign Application Priority Data

| | | | |
|---|---|---|---|
| May 22, 1974 | Japan | | 49-56621 |
| May 22, 1974 | Japan | | 49-56622 |
| July 8, 1974 | Japan | | 49-77371 |
| July 8, 1974 | Japan | | 49-77372 |

[52] U.S. Cl. .............................................. 106/105
[51] Int. Cl.² ........................................... C04B 9/04
[58] Field of Search ........................... 106/105, 108

[56] References Cited

UNITED STATES PATENTS

| | | | |
|---|---|---|---|
| 2,703,762 | 3/1955 | Slayter | 106/105 |
| 2,944,291 | 7/1960 | Prior et al. | 106/105 |

*Primary Examiner*—J. Poer
*Attorney, Agent, or Firm*—Armstrong, Nikaido & Wegner

[57] ABSTRACT

A magnesia cement composition comprising active magnesia, magnesium sulfate, and pulp or a mixture of pulp and fibrous glass. When hardened, this composition yields a crack-free low-shrinkage material. Valuable composite boards are obtained by lamination from the hardened composition and core materials such as cellular concrete, plywood, plastic foam, gypsum plaster board, and cemented excelsior board.

4 Claims, No Drawings

MAGNESIA CEMENT COMPOSITION, PROCESS OF ITS MANUFACTURE, AND COMPOSITE COMPRISING SAME

This invention relates to a magnesia cement composition which when hardened yields a crack-free low-shrinkage plate material and surface coating, and also relates to a laminated composite comprising such a hardened composition and a core material. More particularly, this invention relates to a composition comprising active magnesia, magnesium sulfate, and either pulp or a mixture of pulp and fibrous glass, which when hardened yields a crack-free low-shrinkage plate material or surface coating, and also relates to a laminated composite comprising said hardened material and a core material such as cellular concrete, plywood, plastic foam, gypsum plaster board, or cemented excelsior board.

Magnesia cement generally consists of active magnesia and an aqueous solution of magnesium chloride or magnesium sulfate and hardens by forming a double salt (oxy salt) to produce a solid mass which is superior to other cement materials in such properties as whiteness, adhesiveness, hardness, and smoothness of the surface.

In order to improve physical properties of the hardened magnesia cement, various investigations have heretofore been carried out with respect to, for example, calcining temperature for magnesia, type of magnesium salt, concentration of the aqueous solution of magnesium salt, and mixing ratio between the light magnesia and the aqueous solution of a magnesium salt. For example, it has been known that a suitable calcining temperature for active magnesia is generally in the range from 700° to 800° C., because if calcined at a higher temperature, the magnesia obtained becomes less active. A magnesia cement containing magnesium chloride is superior to that containing magnesium sulfate in strength and shrinkage of the hardened material. It has been known also that a higher concentration of a magnesium salt in the aqueous solution is desirable and a higher ratio of active magnesia against a magnesium salt results in a higher strength and lower shrinkage of the hardened material.

A most important disadvantage of the magnesia cement is its relatively high shrinkage and the formation of crack caused thereby.

Although a magnesia cement containing magnesium chloride as the sole magnesium salt gives a hardened material having a high strength and low shrinkage, the hardened material has disadvantages of blooming and sweating, corrosiveness against metals, and evolution of chlorine-containing gas at high temperatures. When only magnesium sulfate is used, the resulting magnesia cement yields a hardened material of inferior strength and high shrinkage, leading to unavoidable cracking during a long period of use. Such a magnesia cement, however, has no disadvantage of a magnesia cement containing magnesium chloride and is suitable for use as a building material. Therefore, several attempts have so far been made to reduce shrinkage of the hardened material obtained from the magnesia cement containing magnesium sulfate. For example, in order to prevent cracking, a method disclosed in Japanese Patent Publication 23,727/61 employs magnesium hydroxide, magnesia calcined at a low temperature, and an aqueous solution of magnesium sulfate, and a method disclosed in Japanese Patent Publication 26,420/64 employs calcined magnesia, an aqueous solution of magnesium sulfate, and calcium sulfate. These methods, however, were found to be not satisfactory in practice and the hardened material is susceptible to cracking, particularly when such a composition is applied as a thin coat to a substrate material.

The magnesia cement composition of this invention is obtained from 42 to 94% by weight of active magnesia, 5 to 38% by weight of magnesium sulfate, and 1 to 20% by weight of pulp or a mixture of pulp and fibrous glass. According to this invention, the said magnesia cement composition is produced by use of an aqueous solution containing 10% by weight or more of magnesium sulfate, the weight ratio of said aqueous solution to active magnesia being in the range from 0.5 to 3.

The invention is explained below in detail.

The composition of this invention comprises active magnesia, magnesium sulfate, and pulp or a mixture of pulp and fibrous glass. The active magnesia for use in the present composition is preferably a type of relatively high activity with a low degree of sintering.

Active magnesia is easily obtained from magnesium hydroxide, magnesium carbonate, or the like by the heat treatment at 400° to 1000° C. It is obtained, for example, by calcining magnesium hydroxide in an ordinary electric furnace at 400° to 1,000° C. for a 3 hours. If the calcining temperature if below 400° C., it is difficult to obtain active magnesia. When calcined at a temperature below 600° C., the magnesia becomes so high in activity that it gives a magnesia cement which shows a short pot life and a relatively high shrinkage on hardening, although the hardened material has a high strength. On the other hand, if calcined at a temperature exceeding 1,000° C., the magnesia becomes so low in activity that the magnesia cement obtained from it becomes inferior in physical properties such as strength, shrinkage, and water resistance. For the above reasons, in order to obtain a magnesia cement which shows a high strength and low shrinkage on hardening, a suitable calcining temperature for active magnesia is in the range from 600° to 1,000° C., most preferably from 700° to 800° C. The above-said suitable calcining temperature range for active magnesia holds true in the ordinary case where calcination is carried out in an electric furnace for several hours. When powdered magnesium hydroxide or carbonate is calcined by exposure to a high temperature for a short time, the suitable temperature is not limited to the range from 600° to 1,000° C. For example, it is possible to obtain active magnesia by spraying powdered magnesium hydroxide into an atmosphere at a temperature exceeding 1,000° C.

The most important point for the aqueous magnesium sulfate solution for use in the present composition is its concentration. A suitable concentration is 10% by weight or more in terms of anhydrous salt. If the concentration is less than 10%, the magnesia cement gives a hardened material which has increased shrinkage and markedly reduced water resistance and strength. In order to obtain a magnesia cement which yields a hardened material of high strength and low shrinkage, it is most desirable to use an aqueous magnesium sulfate solution having a concentration in the range from 20 to 25%.

The ratio of the aqueous magnesium sulfate solution to the active magnesia, which is an important factor in the present magnesia cement composition, should be in the range from 0.5 to 3 by weight. If the ratio is less then 0.5, it is impossible to mix the composition, while if it exceeds 3, it is impossible to obtain a magnesium cement composition which yields a crackless hardened material having a high hardness and strength. The most desirable weight ratio of the said solution to the active magnesia is in the range from 0.9 to 1.5.

The pulp in the present composition is a necessary component which effectively prevents the hardened material from development of fine cracks. It is also advantageous for the present composition to incorporate fibrous glass which contributes much to the dimensional stability of the hardened material. Both pulp and fibrous glass are effective in increasing strength of the hardened material and the joint use of pulp and fibrous glass exhibits a synergetic effect.

The type of pulp for use in the present composition is not critical and can be bleached or unbleached sulfite pulp, kraft pulp, soda pulp, or semichemical pulp.

The fibrous glass suitable for use in the present composition is chopped strand, 1 to 50 mm in length and 25 $\mu$ or less in diameter. Particularly preferred are kraft pulp and fibrous glass in the form of chopped strand, ¼ to 1 inch in length. Other inorganic and organic fibrous materials which, when used in combination with fibrous glass, are more or less effective in reducing the shrinkage of hardened material are, for example, asbestos, carbon fiber, synthetic fiber, and cotton. These fibrous materials except for carbon fiber, however, are less effective than fibrous glass. Carbon fiber has disadvantges in that it imparts black color to the hardened composition and also it is expensive.

The mixing ratios of the components in the present composition are as shown below:

|  | % by weight |
|---|---|
| Active magnesia | 42 – 49 |
| Magnesium sulfate | 5 – 38 |
| Pulp or a mixture of pulp and fibrous glass | 1 – 20 |

The above mixing ratios are given in terms of anhydrous substance, that is, water which is one of the components of the composition is excepted.

The term "water" as used here means water in the form of hydroxide, hydrate, adsorbed water, and free water absorbed in fine pores, etc. which are released on ignition. The reason for the expression of mixing ratio in terms of anhydrous substance is that the magnesia cement composition absorbs or releases water in accordance with environmental conditions such as humidity and temperature and the maximum amount of such water is about 50%. For the above reason, the mixing ratio is expressed herein in terms of anhydrous component, although the actual ratio should be expressed based on the component containing the said water.

Explanation for the specified ranges of mixing ratios of magnesium sulfate and pulp or a mixture of pulp and fibrous glass are given below in further detail with reference to active magnesia.

The proportion of magnesium sulfate in the composition is preferably in the range from 5 to 38% by weight. As mentioned before, magnesium sulfate is used as an aqueous solution of the concentration of 10% or higher and the weight ratio of this solution to active magnesia should be 0.5 or larger. Therefore, if the proportion of magnesium sulfate in the composition is below 5% in terms of anhydrous salt, mixing of the composition becomes very difficult.

The proportion of pulp or a mixture of pulp and fibrous glass in the composition is preferably in the range from 1 to 20% by weight. If the proportion is below 1%, the effect of the addition of pulp or a mixture of pulp and fibrous glass becomes insignificant, resulting in increased shrinkage and inevitable cracking in the hardened composition. while if the proportion exceeds 20% by weight, uniform mixing of the composition becomes difficult, resulting in a hardened composition of non-uniform structure.

Although the weight ratio of fibrous glass to pulp in the mixture is not subject to any restriction, it is generally in the range from 0.1 to 10, preferably from 0.5 to 2.0. A 1 : 1 mixture is used most frequently.

For the above-said reasons, the mixing ratios were specified as shown before, and the most desirable formulation is as given below.

|  | % by weight |
|---|---|
| Active magnesia | 59 – 88 |
| Magnesium sulfate | 8 – 26 |
| Pulp or mixture of pulp and fibrous glass | 4 – 15 |

The present composition sets to a hardened material by contact with water and the necessary amount of water is supplied as the aqueous solution containing magnesium sulfate. The amount of free water contained in the hardened composition cannot be strictly specified since it varies depending on the conditions of surrounding atmosphere. The amount of water retained in the composition after mixing is 50% at the maximum.

The proportions of light magnesia, magnesium sulfate and pulp or a mixture of pulp and fibrous glass are expressed herein on the basis of hardened composition assumed to be free from fixed water or free water retainable in the hardened composition.

In order to further improve the strength and decrease the shrinkage, it is possible to use a mixture of magnesium sulfate and magnesium chloride instead of using magnesium sulfate alone. The ratio of magnesium sulfate to magnesium chloride should be in the range from 10 to 2. If the ratio is larger than 10, the effect of magnesium chloride on the strength and shrinkage becomes insignificant, while if it is below 2, the hardened composition will show significant disadvantages such as phenomena of strong blooming and sweating, tendency to corrode metals due to the chloride, and emission of a chlorine-containing gas at high temperatures. In using the mixture, concentration and amount of the aqueous solution are the same as in the case where magnesium sulfate is used alone.

The magnesia cement composition of this invention can be prepared by the procedures usually used in preparing conventional cement compositions. A mixture of active magnesia, an aqueous magnesium sulfate solution, and pulp or a mixture of pulp and fibrous glass is thoroughly blended by means of a mixing equipment such as kneader. The resulting paste can be easily applied to a substrate plate material by brushing, spraying, or roll-coating to yield a coated material. A molded magnesia cement material is produced from the paste by use of a metal mold. A molded plate material may be produced by use of a molding press. Hardening of the paste can be performed at room temperature or preferably at an elevated temperature up to 150° C. to reduce the hardening time. Rapid heating to a temperature above 150° C. tends to cause cracking and defective hardening. The paste can be hardened also by use of steam under atmospheric or super-atmospheric pressure. A suitable hardening temperature for obtaining a hardened material of high strength and low shrinkage is in the range from 60° to 120° C. The coating layer applied by spraying onto the wall is hardened usually at ordinary temperature.

The present composition can be laminated onto a core material to form a composite board. Examples of suitable core materials are cellular concrete, plywood, plastic foam, cemented excelsior board, calcium silicate board, perlite board, rock wool board, cemented pulp board, etc. For example, a non-combustible light-weight composite board of high strength with excellent heat-insulating property is obtained by laminating the present composition onto a cellular concrete board.

Although cellular concrete is light in weight and excellent in heat-insulating property and fire resistance, it has a defect of low strength. Accordingly, a cellular concrete board reinforced with steel bar is widely used as the structural material in architecture. Because of its thickness off 75 mm or more, such as reinforced board is heavy in weight and, hence, fails to utilize lightness in weight of the material to the best advantage. A cellular concrete board. 50 mm or less in thickness, currently available on the market has found limited uses owing to insufficient reinforcement.

For the purpose of utilizing light-weight, heat-insulating property, and fire resistance of the cellular concrete, a laminated board with reinforcing surface layer has been proposed. An example is a composite board with a surface layer of asbestos-cement board or calcium silicate board used as reinforcement layer. However, if an organic adhesive is used, such a composite board is decreased in fire resistance and durability. Besides, because of their normal thickness of 3 mm or more, the asbestos-cement board and calcium silicate board add considerable weight to the cellular concrete. Another proposal was a composite board with fibrous-glass-reinforced polyester board laminated onto a cellular concrete core material. Although of light weight and high strength, such a composite board is neither non-combustible nor fire resistant.

There has been proposed a cement composition comprising a lime-based cement such as Portland cement and fibrous glass as reinforcement. Such as composition is unable to provide a high-strength coating material, because the fibrous glass tends to deteriorate by the action of free calcium hydroxide remained in the cement. Another proposal was a gypsum plaster reinforced with fibrous glass. Such as composition has inferior water resistance and insufficient strength.

The present inventors found that glass cloth composed of glass fiber is a reinforcement excellent in strength, fire resistance, and weatherability and that a reinforcing surface layer of maximum strength may be formed from a combination of glass cloth and the aforesaid magnesia cement composition. Since the present magnesia cement composition is not strongly basic, it does not deteriorate the fibrous glass used as reinforecement.

As a result of extensive investigations, the present inventors found that excellent performance characteristics are exhibited by a laminated board comprising a cellular concrete board and a surface layer composed of the aforesaid magnesia cement composition and glass cloth, said surface layer being laminated onto said concrete board. Such a laminated board is light-weight, noncombustible, and excellent in strength as well as in heat-insulating property.

The present invention provides a non-combustible light-weight composite board comprising a cellular concrete board and a hardened surface layer composed of glass cloth and a hydraulic magnesia cement composition obtained from 42 to 94% of active magnesia, 5 to 38% of magnesium sulfate, and 1 to 20% of at least one of the pulp and fibrous glass, said surface layer being laminated onto said concrete board.

Even if glass cloth is not used for reinforcement, the composite board, though not of particularly high strength, is still superior in strength to a cellular concrete itself so that it may find some limited uses.

The invention is explained below in detail.

The composite board of this invention is composed of a cellular concrete and surface layer. The cellular concrete has a specific gravity of 0.15 to 1.80 (bond dry) and a porosity of 10 to 90%. It is generally made by (1) generating a gas in the concrete mix by chemical reaction, (2) adding a foaming agent to the mix, or (3) adding preformed foam to the mix. For example, to make a cellular concrete by generating a gas by chemical reaction, a siliceous substance is admixed with aluminum powder or other powdered metals and quick lime and cured at ordinary temperature or under application of heat and pressure; to make a cellular concrete by adding a foaming agent, cement mortar is admixed with a foaming agent such as emulsifier and cured at ordinary temperature or under application of heat and pressure; to make a cellular concrete by adding a pre-formed foam, cement mortar is admixed with expanded granules such as Perlite and cured at room temperature or under application of heat and pressure. A composite board with particularly high strength may be produced by using a cellular concrete reinforced with synthetic fibers or steel bar.

The glass cloth suitable for use as a reinforcement in making the coating layer according to this invention is roving cloth, yarn cloth, chopped strand mat, or non-woven fabric. Roving cloth is preferred in producing a composite board with particularly high strength.

The surface layer composed of glass cloth and magnesia cement should have a thickness of at least 0.2 mm, because if the thickness is below 0.2 mm, a sufficient strength cannot be attained. A preferable thickness is 0.5 to 6.0 mm.

The noncombustible light-weight composite board of this invention may be manufactured in several ways. For example, it is manufactured by placing glass cloth on the surface of cellular concrete, applying magnesia cement composition to the glass cloth by trowelling, roll-coating, brushing, or spraying to form a layer composed of glass cloth and magnesia cement, and allowing the layer to harden. For improving adhesion between the cellular concrete and the coating layer, it is advantageous to apply a pre-coat of magnesia cement to the surface of cellular concrete. By applying proper pressure to the unhardened coating layer so as not to injui the cellular concrete, there is formed a surface layei with dense texture and improved adhesion to the cellular concrete.

Another procedure comprises applying magnesia cement to a synthetic resin film (for example, polyester film) or a sheet metal treated with a releasing agent, placing thereon a glass cloth, applying again magnesia cement, placing thereon a cellular concrete, and allowing the magnesia cement to harden. The application of pressure, as in the above-said procedure, results in a hardened coating layer with dense texture and improved adhesion to the cellular concrete. After having been hardened. the composite board is stripped of the synthetic resin film or the sheet metal.

A further procedure comprises applying magnesia cement to a synthetic film (for example, polyester film) or a sheet metal treated with a releasing agent, placing thereon a glass cloth, applying again magnesia cement, placing thereon a synthetic resin film (for example, polyester film) or a sheet metal treated with a releasing agent, and allowing the magnesia cement to harden while applying pressure by means of a press to obtain a hardened sheet material composed of the magnesia cement and the glass cloth. This sheet material is bonded to a cellular concrete with an organic or inorganic adhesive to form a composite board. An inorganic adhesive is preferred to the organic one in order not to decrease fire resistance of the board.

Hardening of the surface coating layer composed of magnesia cement and glass cloth can be effected at room temperature or preferably by heating at a temperature up to 150° C. in order to reduce the hardening time. Rapid heating to a temperature above 150° C. tends to cause cracking or defective hardening. Hardening can also be effected by use of steam under atmospheric or superatmospheric pressure. A suitable hardening temperature is in the range from 60° to 120° C.

The composite board obtained according to this invention is a high-strength board which retains those properties such as lightness in weight, heat-insulating property, and fire resistance which are characteristic of the cellular concrete. The low scratch resistance and the tendency to absorb water, which are disadvantages of cellular concrete, have been improved in the present composite board. Because of its white surface with dense texture, the present board is also suitable for decorative uses.

In the same manner as mentioned above, various composite boards may be produced by using in place of the cellular concrete such core materials as foam plastics, plywood, cemented excelsior board, cemented pulp board, gypsum plaster board, and the like.

EXAMPLE 1

A magnesia cement composition was prepared according to the following recipe:

|  | Parts by weight | (% by weight) |
| --- | --- | --- |
| Magnesia, calcined at 800° C. | 100 | (77) |
| Aqueous magnesium sulfate solution, 300 g/liter | 100 | (19) |
| Pulp, BKP | 5 | ( 4) |

The composition was thoroughly mixed. The resulting mix was filled in a mold, 100 × 100 × 3 mm, and heated at 100° C. for 40 minutes to effect hardening. The molded board had a bending strength of 100 kg/cm$^2$.

EXAMPLE 2

Magnesium hydroxide was burned in an electric furnace at 500°, 600°, 700°, 800°, 900°, 1,000°, or 1,100° C. for 5 hours. By use of the resulting seven types of active magnesia, magnesia cement compositions were prepared according to the following mixing ratio. The composition was thoroughly mixed and the resulting mix was filled in a mold, 100 × 100 3 mm, and heated at 100° C. for 40 minutes to effect hardening.

| Mixing ratio: | Parts by weight |
| --- | --- |
| Calcined magnesia | 100 |
| Aqueous magnesium sulfate solution, 2.5-% | 100 |
| Pulp, BKP | 25 |
| Glass fiber, 12 mm in length | 2.5 |

The composition contained 74, 19 and 7% of calcined magnesia, magnesium sulfate, and fibrous material (pulp + glass fiber), respectively. The water content of the hardened molded material was in the range from 30 to 34%.

The molded sheet material had physical properties as shown in the following Table.

Table

| Calcining temperature for MgO, ° C. | Bending strength, kg/cm$^2$ | Shrinkage, % |
| --- | --- | --- |
| 500 | 180 | 0.35 |
| 600 | 170 | 0.10 |
| 700 | 170 | 0.05 |
| 800 | 170 | 0.05 |
| 900 | 150 | 0.05 |
| 1000 | 120 | 0.15 |
| 1100 | 100 | 0.30 |

EXAMPLE 3

Compositions were prepared according to the recipe used in Example 2 by using an active magnesia obtained by calcination of magnesium hydroxide at 800° C. for 5 hours and aqueous magneisum sulfate solutions of varied concentrations (5-%, 10-%, 15-%, 20-%, and 25-%). Each composition was thoroughly mixed and hardened with heating. The resulting 5 types of hardened magnesia cement compositions were tested for physical properties.

The results obtained were as shown in the following Table.

Table

| Concent- ration of MgSO$_4$, % | MgO/MgSO$_4$/ fiber | Water content of hardened material, % | Bending strength, kg/cm$^2$ | Shrin- kage, % |
| --- | --- | --- | --- | --- |
| 5 | 91/45/45 | 45 | 90 | 0.5 |
| 10 | 87/9/4 | 41 | 100 | 0.35 |
| 15 | 83/13/4 | 38 | 120 | 0.2 |
| 20 | 80/16/4 | 37 | 150 | 0.1 |
| 25 | 77/19/4 | 34 | 170 | 0.05 |

EXAMPLE 4

Compositions were prepared according to the recipe used in Example 2 by using an active magnesia obtained by calcination at 800° C. for 5 hours and varied amounts (25, 50, 100, 200, 300, and 350 parts by weight) of 25-% aqueous magnesium sulfate solution. Each composition was thoroughly mixed and molded with heating. The resulting 6 types of hardened magnesia cement compositions were tested for physical properties.

The results obtained were as shown in the following Table.

Table

| MgSO₄ soln., parts by weight | MgO/MgSO₄/ fiber | Water content after hardened, % | Bending strength, kg/cm² | Shrinkage % |
|---|---|---|---|---|
| 25 | 90/6/4 | 13 | unproducible | |
| 50 | 85/11/4 | 22 | 170 | 0.05 |
| 100 | 77/19/4 | 34 | 170 | 0.05 |
| 200 | 65/32/3 | 47 | 120 | 0.15 |
| 300 | 56/42/2 | 50 | 80 | 0.35 |
| 350 | 52/46/2 | 50 | 60 | 0.50 |

EXAMPLE 5

Compositions were prepared according to the recipe used in Example 2 by using an active magnesia obtained by calcination at 800° C. for 5 hours and, in addition to 25 parts by weight of pulp, 25 parts by weight of other fibrous materials (glass fiber, rayon, cotton, asbestos, and carbon fiber). Each composition was thorougly mixed and molded with heating. The resulting 5 types of hardened magnesia cement compositions were tested for physical properties. The results obtained were as shown in the following Table Table

| First fiber | Second fiber | Bending strength, kg/cm² | Shrinkage, % |
|---|---|---|---|
| Pulp (BKP) | Glass fiber | 170 | 0.05 |
| Pulp (BKP) | Rayon | 100 | 0.20 |
| '' | Cotton | 100 | 0.20 |
| '' | Asbestos | 100 | 0.25 |
| '' | Carbon fiber | 160 | 0.05 |

EXAMPLE 6

Compositions were prepared according to the recipe used in Example 2 by using an active magnesia obtained by calcination at 800° C. for five hours and varied amounts (1, 2, 5, 10, 20, and 35 parts by weight) of a pulp-glass fiber (1 : 1) mixture. After having been hardened, the resulting six types of magnesia cement compositions were tested for physical properties. The results obtained were as shown in the following Table. The water content of each hardened composition was in the range from 30 to 34%.

Table

| Amount of fiber, parts by weight | MgO/MgSO₄/ fiber | Bending strength, kg/cm² | Shrinkage, % |
|---|---|---|---|
| 1 | 79/20/1 | 75 | 0.8 |
| 2 | 78/20/2 | 130 | 0.2 |
| 5 | 77/19/4 | 170 | 0.05 |
| 10 | 74/19/7 | 170 | 0.05 |
| 20 | 69/17/14 | 150 | 0.05 |
| 35 | 63/16/21 | 105 | 0.05 |

EXAMPLE 7

Compositions were prepared according to the recipe used in Example 2 by using an active magnesia obtained by calcination at 800° C. for 5 hours and 5 parts by weight of pulp, glass fiber, or a mixture of pulp and glass fiber. Each composition was thoroughly mixed and molded with heating. The molded sheet was tested for physical properties. The results obtained were as shown in the following Table.

Table

| Fibrous material | Bending strength, kg/cm² | Shrinkage, % |
|---|---|---|
| 5 Parts by weight of pulp | 150 | 0.10 |
| 5 Parts by weight of pulp and glass fiber | 170 | 0.05 |
| 5 Parts by weight of glass fiber | 145 | 0.20 |

The hardened material of high strength obtained from the composition of this invention is excellent in whiteness and adhesion, has a high hardness and its surface is of dense texture. The present composition can also be applied to a substrate material to form a thin coating layer which is suitable for surface decoration. The present composition has an advantage of shortened hardening time because it is heat-hardenable.

EXAMPLE 8

A magnesia cement composition was prepared according to the following mixing ratio:

| | Parts by weight | (% by weight) |
|---|---|---|
| Magnesia calcined at 800° C. | 100 | (77) |
| Aqueous MgSO₄ solution, 300 g/liter | 100 | (19) |
| Pulp, BKP | 2.5 | (2) |
| Glass fiber, ½ in. | 2.5 | (2) |

Figures given in parentheses are proportions of MgO, MgSO₄, and fibers in percent by weight of dry basis. The above mixture was thoroughly dispersed and mixed. The resulting magnesia cement compositon was applied to a cellular concrete, 5 cm in thickness and 0.50 g/cm² in specific gravity (produced by curing a siliceous material and a calcareous material at a high temperature and under a high pressure) to form a coating layer, 1.5 mm in thickness, which was covered with a sheet of polyester film. In the same manner, a coating layer was formed on the other side of the cellular concrete. The resulting composite coated on both sides was cured by means of a press at 100° C. for 15 minutes under an applied pressure of 3 kg/cm². The resulting composite board was stripped of the polyester film. It had a specific gravity of 0.63 . The surface coating layer showed neither crack nor peeling and had white surface of dense texture. Bending strength of the composite board was 20 kg/cm².

EXAMPLE 9

A magnesia cement composition was prepared according to the following mixing ratio:

|                               | Parts by weight | (% by weight) |
|-------------------------------|-----------------|---------------|
| Magnesia calcined at 800° C.  | 100             | (77)          |
| Aqueous MgSO₄ solution, 300 g/liter | 100       | (19)          |
| Pulp, BKP                     | 2.5             | (2)           |
| Glass fiber, ½ in.            | 2.5             | (2)           |

Figures given in parenthesis are proportions of MgO, MgSO₄, and fibers in percent by weight on dry basis. The above mixture was thoroughly dispersed and mixed. The resulting magnesia cement composition was applied to a sheet of polyester film to form a thin layer. A piece of glass roving, 300 g/m², was placed on said magnesia cement layer and applied with the magnesia cement composition and covered with a sheet of polyester film. The resulting assembly was heated-hardened by means of a hot press at 100° C. for 15 minutes. The resulting sheet material showed neither crack nor peeling and had white surface with dense texture.

EXAMPLE 10

A magnesia cement composition was prepared according to the following mixing ratio:

|                               | Parts by weight | (% by weight) |
|-------------------------------|-----------------|---------------|
| Magnesia calcined at 800° C.  | 100             | (77)          |
| Aqueous MgSO₄ solution, 300 g/liter | 100       | (19)          |
| Pulp, BKP                     | 2.5             | (2)           |
| Glass fiber, ½ in.            | 2.5             | (2)           |

Figures given in parentheses are proportions of MgO, MgSO₄, and fibers in percent by weight on dry basis. The above mixture was thoroughly dispersed and mixed. The resulting magnesia cement composition was applied to a cellular concrete board, 5 cm in thickness and 0.50 g/cm³ in specific gravity (produced by curing a siliceous material and a calcareous material at a high temperature and under a high pressure) to form a thin coating layer. A piece of glass cloth (roving cloth, 300 g/cm²) was placed on said magnesia cement layer and applied again with the magnesia cement composition by trowelling to form a surface coating layer, 1.5 mm in thickness, which was covered with a sheet of polyester film. In the same manner, a surface coating layer was formed on the other side of the cellular concrete board. The resulting composite coated on both sides was cured by means of a press at 100° C. for 15 minutes under an applied pressure of 3 kg/cm². The hardened composite board was stripped of the polyester film. It had a specific gravity of 0.65. The surface coating layer showed neither crack nor peeling and had a white surface with dense texture. The bending strength was 65 kg/cm² which was markedly higher than that of 15 kg/cm² of the cellular concrete board.

EXAMPLE 11

The same magnesia cement composition, cellular concrete board, and glass cloth (roving cloth) as used in Example 10 were used.

The magnesia cement composition was applied to sheet of polyester film. A piece of glass cloth was placed on the resulting magnesia cement layer and applied again with the magnesia cement composition to obtain a sheet material composed of magnesia cement and glass cloth. Two such sheet materials were prepared and assembled with the cellular concrete board therebetween. The assembly with polyester film on both outer sides was cured by means of a press at 100° C. for 15 minutes under an applied pressure of 3 kg/cm². After having been hardened and cooled, the composite board was stripped of the polyester film. The board had a specific gravity of 0.70. The surface coating layers showed neither crack nor peeling and had white surfaces of dense texture. The bending strength was 65 kg/cm² which was markedly higher than that of 15 kg/cm² of the cellular concrete board.

EXAMPLE 12

Composite boards were prepared in the same manner as in Example 11, except that the surface coating layers were varied in thickness (0.15, 0.2, 0.5, 1.0, 2.0, 3.0, 5.0, and 8.0 mm) by use of varied amounts of the magnesia cement composition. Physical properties of the resulting composite boards were as shown in the following table.

Table

| Thickness, mm | Specific gravity | Bending strength, kg/cm² | Appearance       |
|---------------|------------------|--------------------------|------------------|
| 0.15          | 0.63             | 20                       | Cracking         |
| 0.2           | 0.64             | 40                       | Some fine cracks |
| 0.5           | 0.66             | 48                       | Flawless         |
| 1.0           | 0.68             | 60                       | Flawless         |
| 2.0           | 0.70             | 65                       | Flawless         |
| 3.0           | 0.73             | 70                       | Flawless         |
| 5.0           | 0.89             | 75                       | Flawless         |
| 8.0           | 1.01             | 75                       | Flawless         |

EXAMPLE 13

The same cellular concrete board and glass cloth (roving cloth) as used in Example 10 were used. A magnesia cement composition was prepared according to the following mixing ratio:

|                               | Parts by weight | (% by weight) |
|-------------------------------|-----------------|---------------|
| Magnesia, calcined at 800° C. | 100             | (71)          |
| Aqueous MgSO₄ solution, 300 g/liter | 150       | (26)          |
| Pulp, BKP                     | 2.5             | (1.5)         |
| Glass fiber, ½ in.            | 2.5             | (1.5)         |

Figures in parentheses are proportions of MgO, MgSO₄, and fibers in percent by weight on dry basis. The above mixture was thoroughly dispersed and mixed. The resulting paste was applied by means of a spray gun to a piece of glass cloth placed on the cellular concrete board to form a layer 2 mm in thickness, which was covered with a sheet of polyester film. In the same manner, another coating layer was formed on the other side of the cellular concrete board. The resulting composite was cured at 100° C. for 15 minutes under an applied pressure of 3 kg/cm². After having been hardened and cooled, the resulting composite board was stripped of the polyester film. The composite board, 0.70 in specific gravity, showed neither crack nor peeling and had white surfaces of dense texture. It had a bending strength of 70 kg/cm² which was markedly higher than that of 15 kg/cm² of the cellular concrete board.

EXAMPLE 14

A composite board was prepared in the same manner as in Example 10, except that curing of the surface coating layer was carried out under an atmosphere of steam at 110° C, for 30 minutes. The resulting composite board, 0.65 in specific gravity, showed neither crack nor peeling in the surface coating layer and had a white surface of dense structure. The bending strength was 75 kg/cm² which was markedly higher than that of 15 kg/cm² of the cellular concrete board.

EXAMPLE 15

A composite board was obtained in the same manner as in Example 10, except that the glass cloth used was yarn cloth, 250 g/m², in place of the roving cloth, 300 g/m². The resulting composite board, 0.65 in specific gravity, showed neither crack nor peeling in the surface coating layer and had a white surface of dense texture. The bending strength was 60 kg/cm² which was markedly higher than that of 15 kg/cm² of the cellular concrete board.

EXAMPLE 16

A magnesia cement composition was prepared according to the following mixing ratio:

|  | Parts by weight | (% by weight) |
| --- | --- | --- |
| Magnesia, calcined at 800° C. | 100 | (77) |
| Aqueous MgSO₄ solution, 300 g/liter | 100 | (19) |
| Pulp, BKP | 2.5 | (2) |
| Glass fiber, ½ in. | 2.5 | (2) |

Figures in parentheses are proportions in percent by weight on dry basis. The above mixture was thoroughly dispersed and mixed. A foamed phenolic resin board, 5 cm in thickness and 0.1 in specific gravity, was coated on both sides with the said magnesia cement composition and hardened at 100° C. for 20 minutes. The bending strength and fire retardancy of the resulting composite board were as shown in the following Table.

Table

| No. | Thickness of coating layer,* mm | Weight, kg/m² | Bending strength, kg/cm² | Fire retardancy** |
| --- | --- | --- | --- | --- |
| 1 | 0 | 0.5 | 4 | Dense smoke (test specimen deformed) |
| 2 | 0.25 | 1.0 | 6 | Smoke generated very little |
| 3 | 0.5 | 1.5 | 8 | No smoke generation |
| 4 | 1.5 | 3.5 | 10 | " |
| 5 | 2.5 | 5.5 | 15 | " |
| (Comparative Example) | 6.0 (slate) | 12.5 | 50 | " |

Note
*Thickness of both coating layers.
**Smoke generation when held above a propane flame (about 1,000° C.) for 5 minutes.

EXAMPLE 17

A magnesia cement composition was prepared according to the following mixing ratio.

|  | Parts by weight | (% by weight) |
| --- | --- | --- |
| Magnesia, calcined at 800° C. | 100 | (77) |
| Aqueous MgSO₄ solution, 300 g/liter | 100 | (19) |
| Pulp, BKP | 2.5 | (2) |
| Glass fiber | 2.5 | (2) |

The above mixture was thoroughly dispersed and mixed. Hemihydrate gypsum was mixed with water and a gypsum plaster board, 5 mm in thickness, was prepared. the gypsum plaster board was coated on both sides with the said magnesia cement composition and hardened at 100° C. for 20 minutes. Physical properties of the resulting composite board were as shown in the following Table.

Table

| No. | Thickness of coating layer, mm | Weight, kg/cm² | Bending strength, kg/cm² Bone dry | Bending strength, kg/cm² Wet* | Fire** Resistance |
| --- | --- | --- | --- | --- | --- |
| 1 | 0 | 5.0 | 40 | 10 | OK |
| 2 | 0.25 | 5.4 | 45 | 17 | " |
| 3 | 0.5 | 5.9 | 50 | 30 | " |
| 4 | 1.5 | 7.8 | 70 | 45 | " |
| 5 | 2.5 | 9.7 | 100 | 60 | " |
| 6 | 3.5 | 11.5 | 110 | 65 | " |
| 7 | 5.0 | 14.8 | 130 | 73 | " |
| Comparative Ex. 8 | 12 (commercial gypsum board) | 9.0 | 70 | 30 | Surface burned |

Note:
*After immersion in water for 5 minutes.
**Strength of composite board after having been held above a propane flame for 5 minutes.

EXAMPLE 18

Compositions were prepared according to the mixing ratios as shown in the following Table using an active magnesia calcined at 800° C. for 5 hours. Each composition was thoroughly mixed and the mix was filled in a mold, 100 × 100 × 3 mm, and hardened by heating at 100° C. for 40 minutes.

| Table | | | | |
|---|---|---|---|---|
| | No. 1 | No. 2 | No. 3 | No. 4 |
| Calcined magnesia, parts | 100 | 100 | 100 | 100 |
| Aqueous solution containing 250 g/liter of MgSO$_4$ and 60 g/liter of MgCl$_2$, parts | 40 | 100 | 200 | 300 |
| Pulp, BKP, parts | 5 | 5 | 5 | 5 |
| Glass fiber, 1.2 mm, parts | 5 | 5 | 5 | 5 |

The molded plates were tested for physical properties. The results obtained were as shown in the following Table. The above composition was coated on a light-weight concrete to form a thin coating and hardened by heating at 100° C. for 40 minutes. The hardened specimen was inspected for development of cracking. The results obtained were also shown in the following Table.

| Table | | | |
|---|---|---|---|
| | Bending strength, kg/cm$^2$ | Shrinkage, % | Blooming | Cracking in coating layer |
| No. 1 | 130 | 0.20 | None | Yes |
| No. 2 | 180 | 0.05 | None | No |
| No. 3 | 170 | 0.03 | None | No |
| No. 4 | 130 | 0.15 | None | A few |

EXAMPLE 19

A magnesia cement composition was prepared according to the following mixing ratio:

| | Parts by weight | (% by weight) |
|---|---|---|
| Magnesia, calcined at 800° C. | 100 | 18 |
| Aqueous MgSO$_4$ solution, 300 g/liter | 100 | (19) |
| Pulp, BKP | 2.5 | (2) |
| Glass fiber, ½ in. | 2.5 | (2) |

Figures in parentheses are proportions in percent by weight on dry basis. The composition was thoroughly dispersed and mixed. The resulting mix was coated on sheets of polyester film to varied thickness (0.1, 0.3, 0.5, 1.0, 2.0, and 3.0 mm). Two coated sheets were prepared for each thickness of coating. Each pair of coated sheets was attached to both sides of a plywoood, 3 mm in thickness. Each plywood with coated sheet on both sides was pressed at 100° C. for 5 to 30 minutes under an applied pressure of 5 kg/cm$^2$. The resulting six types of composite boards were tested for physical properties. The results obtained were as shown in the following Table.

| Table | | | | |
|---|---|---|---|---|
| Run No. | Thickness of layer coated on one side, mm | Specific gravity, g/cm$^3$ | Bending strength, kg/cm$^2$ | Fire resistance* |
| 1 | 0.1 | 0.55 | 380 | Cracking; ignited after 3 minutes |
| 2 | 0.3 | 0.70 | 380 | Carbonized partly |
| 3. | 0.5 | 0.80 | 400 | Carbonized partly |
| 4 | 1.0 | 0.90 | 420 | No change |
| 5 | 2.0 | 1.40 | 400 | No change |
| 6 | 3.0 | 1.75 | 380 | No change |
| 7 | Plywood only | 0.50 | 380 | Burnt completely |

Note:
*Fire resistance: Change observed after the test specimen had been held above a propane flame (1,000° C.) for 5 minutes.

What is claimed is:
1. A magnesia cement composition comprising 42 to 94% by weight of active magnesia, 5 to 38% by weight of magnesium sulfate, and 1 to 20% by weight of pulp.
2. A magnesia cement composition comprising 42 to 94% by weight of active magnesia, 5 to 38% by weight of magnesium sulfate, and 1 to 20% by weight of a mixture of pulp and glass fiber.
3. A process for producing a magnesia cement composition which comprises mixing 1 part by weight of active magnesia, 0.5 to 3 parts by weight of an aqueous solution containing at least 10% by weight of magnesium sulfate, and pulp.
4. A process for producing the magnesia cement composition defined in claim 3, wherein the composition includes glass fibers.

* * * * *